UNITED STATES PATENT OFFICE.

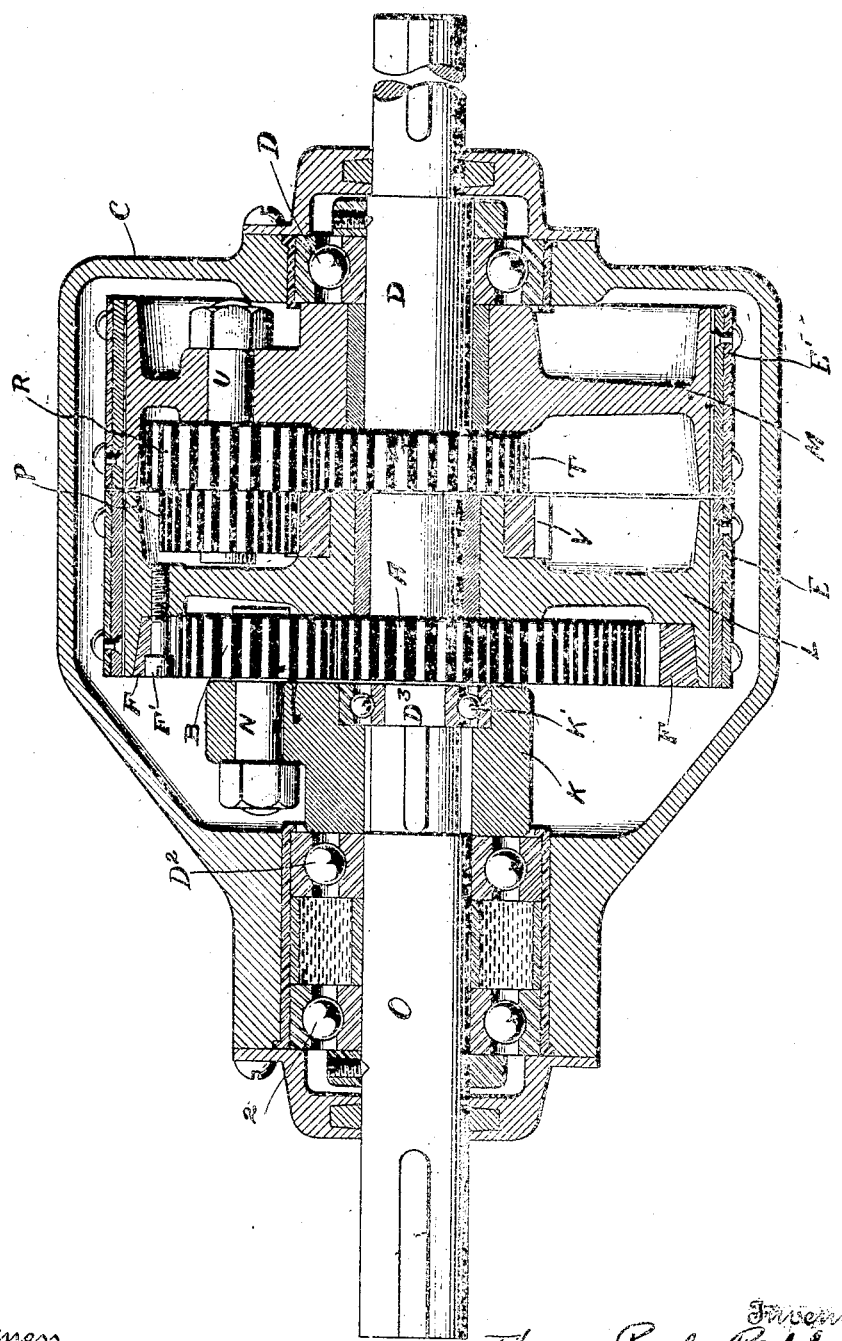

THOMAS PAUL REDDIN, OF BRIDGEPORT, CONNECTICUT.

POWER TRANSMISSION.

1,328,588.　　　Specification of Letters Patent.　　Patented Jan. 20, 1920.

Application filed March 25, 1919. Serial No. 284,894.

*To all whom it may concern:*

Be it known that I, THOMAS PAUL REDDIN, a citizen of the United States, residing at Bridgeport, in the county of Fairfield and State of Connecticut, have invented certain new and useful Improvements in Power Transmissions, of which the following is a specification.

The present invention, which is an improvement on the power transmission of my application filed October 11, 1918, Serial No. 257,690, has for its object the provision of a novel arrangement and combination of drums and gears whereby power may be transmitted, in a variety of ways, from a driving to a driven shaft, comprehended in the mechanism, according to requirements of speed and power.

The present invention comprises driving and driven shafts, loosely mounted drums, means for securing or releasing either or both of the drums, and systems of gears or pinions combined with the drums and the driving and driven shafts in a novel manner to accomplish the different speed and power changes.

The accompanying drawing is a longitudinal section through the complete power transmission, the shafts and certain of the gears or pinions being in full lines.

The parts may be carried by and housed within a casing C. The driving shaft appears at D and the driven shaft at O, the two being mounted in suitable ball bearings $D^1$ and $D^2$.

Rigidly splined or keyed to shaft O is a head or bracket K which contains a suitable ball bearing K' in which is mounted the reduced end $D^3$ of shaft D.

Loosely mounted on shaft D are the drums L, M. Brake straps or other suitable means E, E' may be made to contact with the peripheries of the drums L, M by the operation of any suitable means, not shown. The brake straps E, E' are shown as released from the drums L, M.

Securely splined or fastened to the shaft D is a driving gear T. Keyed or splined to the drum L is a gear V.

There are a plurality of bolts or studs U carried by the drum M, for instance, three (one only being shown). Loosely mounted on the bolts or studs U are double pinions P, R which are formed integrally or suitably connected together, the pinion P meshing with the gear V; and the pinion R meshing with the driving gear T. There are as many pinions P, R, as there are studs used, three for instance (only one set of pinion P, R is shown).

Securely fastened to the drum L, as by screws F', for instance, is an internal gear F. Secured to the shaft D in any suitable manner is a gear A.

A plurality of bolts or studs N are carried by the bracket or head K; only one of these bolts or studs is shown. A plurality of pinions B, one for each bolt or stud N, are journaled on the respective bolts or studs and mesh with the gear A and the internal gear F.

Power is transmitted from the driving shaft D through the spur gear A to the pinions B which transfer a corresponding reaction to the internal gear F, the drum L and the spur gear V.

Similarly, power is transmitted from the driving shaft D and spur gear T, through the pinions P, R to the drum M, or to the drum L through the spur gear V.

If the brake band E is contracted and the drum L locked against revolving, the band E receives the full force of the reaction.

If the brake band E is released so that the drum L is free, and the brake band E' is contracted to lock the drum M against revolution, the force or reaction is transferred from the internal gear F through drum L to spur gear V and from spur gear V through pinions P, R and spur gear T, back to shaft D.

The driving spur gear T acting through the pinions P, R, absorbs this force of reaction and regulates the speed of the drum L and, consequently, the speed of the shaft O.

If the brake band E' is released to free the drum M and the brake band E is clamped on the drum L to lock said drum L, power is transmitted from the driving shaft D through the intermediate pinions B to the shaft O. The shaft O then revolves slowly in the same direction as the shaft D, while the drum M revolves idly upon the shaft D.

If both brake bands E, E' are released, as shown in the drawing, both drums L, M revolve idly upon shaft D and no motion is transmitted to the shaft O.

If the brake band E' is clamped on the periphery of the drum M, the brake band E being released, the speed of the shaft O is changed. The gears T, P, R and V then regulate the speed of the drum L.

What I claim is:

1. A power transmission comprising driving and driven shafts, a plurality of drums loose in relation to the said shafts, a driving gear fixed to the driving shaft, a head or bracket fixed to the driven shaft, gears carried by one of the drums and driven by the driving gear, a gear carried by the remaining drum which meshes with the last named gears, another gear carried by the remaining drum, gears carried by the head or bracket meshing with the gear last named, a gear carried by the driving shaft meshing with the gears last named, and means for holding either of said drums against rotation.

2. A power transmission comprising driving and driven shafts, a plurality of drums loose on the driving shaft, a bracket or head carried by the driven shaft, a driving gear secured to the driving shaft, a plurality of pinions carried by one of the drums which mesh with the driving gear, a gear carried by the remaining drum, with which said plurality of pinions mesh, an internal gear carried by the remaining drum, a plurality of pinions carried by the bracket or head which mesh with the internal gear, a gear carried by the driving shaft meshing with gears last named, and means for holding either of said drums against rotation.

3. A power transmission comprising a driving shaft, a driven shaft, a pair of drums loosely mounted on the driving shaft, independent brake bands whereby either of said drums may be checked or held, a spur gear secured to the driving shaft, a plurality of bolts or studs carried by one of the drums, a gear carried by the other drum, a plurality of duplicate pinions mounted to rotate on said bolts or studs and respectively in mesh with the gears aforesaid, an internal gear carried by the other drum, a head or bracket secured to the driven shaft, a gear secured to the driving shaft, a plurality of bolts or studs carried by said bracket or head, and a plurality of gears mounted on said bolts or studs and meshing with the internal gear and the gear last named.

In testimony whereof I affix my signature.

THOMAS PAUL REDDIN.